(12) United States Patent
Koeroghlian et al.

(10) Patent No.: US 9,081,255 B2
(45) Date of Patent: Jul. 14, 2015

(54) EMBEDDED LINEAR MOTOR DRIVE FOR IR CAMERA SHUTTER

(71) Applicant: BAE Systems Information and Electronic Systems Integration Inc., Nashua, NH (US)

(72) Inventors: Mark M. Koeroghlian, The Woodlands, TX (US); Mark J. Kelley, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/540,624

(22) Filed: Nov. 13, 2014

(65) Prior Publication Data

US 2015/0062411 A1   Mar. 5, 2015

Related U.S. Application Data

(62) Division of application No. 13/592,474, filed on Aug. 23, 2012, now Pat. No. 8,911,164.

(60) Provisional application No. 61/526,534, filed on Aug. 23, 2011.

(51) Int. Cl.
| | |
|---|---|
| *G03B 9/08* | (2006.01) |
| *G03B 9/36* | (2006.01) |
| *H02K 41/03* | (2006.01) |
| *H04N 5/225* | (2006.01) |
| *H04N 5/235* | (2006.01) |

(52) U.S. Cl.
CPC .. *G03B 9/36* (2013.01); *G03B 9/08* (2013.01); *H02K 41/031* (2013.01); *H04N 5/2254* (2013.01); *H04N 5/2353* (2013.01)

(58) Field of Classification Search
USPC ............ 396/463; 310/12.01, 12.03, 12.17, 14
See application file for complete search history.

(56) References Cited

U.S. PATENT DOCUMENTS

| | | | | | |
|---|---|---|---|---|---|
| 3,820,144 | A | * | 6/1974 | Neau et al. ..................... | 396/463 |
| 4,785,210 | A | * | 11/1988 | Maruyama et al. ......... | 310/12.04 |
| 5,477,299 | A | * | 12/1995 | Takahashi ..................... | 396/516 |
| 5,619,296 | A | * | 4/1997 | Furlani et al. ................. | 396/463 |
| 5,796,186 | A | * | 8/1998 | Nanba et al. ..................... | 310/14 |
| 6,670,738 | B2 | * | 12/2003 | Kasahara et al. ............. | 310/309 |
| 2009/0195087 | A1 | * | 8/2009 | Kurosawa ................. | 310/12.17 |

* cited by examiner

*Primary Examiner* — Clayton E Laballe
*Assistant Examiner* — Warren K Fenwick
(74) *Attorney, Agent, or Firm* — Daniel J. Long

(57) ABSTRACT

An embedded linear motor drive for an IR camera comprising linear motor components that integrates into a sliding shutter is disclosed. The linear motor components can be a linear array of magnets, or a series of ridges or gear teeth. A motor drive is aligned with the linear motor components. The drive can be a series of coils connected to a power source that can move the shutter when the coils are energized in series. The drive can also be a pinion shaft with a friction wheel at one end or pinion gear that can connect to the ridges or gear teeth and move the shutter when the shaft is rotated.

8 Claims, 12 Drawing Sheets

EMBEDDED LINEAR MOTOR DRIVE FOR IR CAMERA SHUTTER

CROSS-REFERENCE TO RELATED APPLICATIONS

This is a divisional application of U.S. application Ser. No. 13/592,474 filed Aug. 23, 2012 and claims rights under 35 USC §119(e) from U.S. application Ser. No. 61/526,534 filed Aug. 23, 2011 the contents of which are incorporated herein by reference.

TECHNICAL FIELD

Embodiments are generally related to Infra Red (IR) cameras. Embodiments are also related camera shutter motors. Embodiments are additionally related to a linear motor drive for a sliding IR camera shutter.

BACKGROUND OF THE INVENTION

In optical systems, and in particular in imaging systems, such as thermal cameras, it is needed to provide a shutter that can be placed in front of the imaging sensor and block its view when desired in an Infra-Red (IR) camera a shutter is provided for occasional calibration of the imaging sensor, or for preventing undesired irradiation from reaching the imaging sensor.

Calibration is necessary in thermal sensors in order to ensure accurate measurements and to obtain correct images. Calibration is especially important in IR cameras, which have a thermal sensor that is not cooled to supercool temperatures.

Every once in a while a uniform surface of a black body is placed in front of the sensor and the sensor matrix is calibrated to measure a surface of uniform temperature. There are known IR cameras, which include such as optical shutter. Typically the shutter comprises a black painted plate, which is displaced between two positions in front of the sensor, a blocking position in front of the sensor view and a retracted position, where the shutter is removed from the sensor's field of view.

A known shutter mechanism includes a shutter plate turning about a motor axis to and out of the blocking position. Another shutter mechanism includes a shutter plate coupled to a motor with linear transmission so as to facilitate linear motion of the shutter between the two positions. In some cases it is desired to have a shutter mechanism that is silent in order to prevent exposing the existence and location of the imagining system.

A staring array, staring-plane array, Focal-Plane Array (FPA), or focal-plane is an image sensing device consisting of an array (typically rectangular) of light-sensing pixels at the focal plane of a lens. FPAs are used most commonly for imaging purposes for example taking pictures or video imagery, but can also be used for non-imaging purposes such as spectrometry, LIDAR (Light Detection And Ranging), and wave-front sensing.

The focal plane arrays in IR camera cores must be calibrated periodically, and to execute the calibration process, the focal plane array is presented with a uniform IR source. This is typically accomplished by covering the focal plane array window with a uniform temperature, uniform emissivity plate, which is commonly referred to as a shutter. It is important that the shutter be as close to the window as possible to eliminate any stray IR energy entry into the chamber, especially for wide field of view applications. It is also important that the shutter and movement mechanism not intrude on the space in front of the lens assembly. The lens assembly must be placed as close to the sensor element as possible to minimize the size and cost of the lens assembly.

A need therefore exists for an improved space saving, lower cost, linear motor drive for a sliding IR camera shutter.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for Infra Red (IR) cameras.

It is another aspect of the disclosed embodiments to provide camera shutter motors.

It is yet another aspect of the disclosed embodiments to provide for a linear motor drive for a sliding IR camera shutter.

It is another aspect of the present invention to provide an embedded motor drive for a camera includes linear magnetic motor components attached to the camera shutter. The motor drive also includes an array of coils attached to a power source that is aligned with the linear magnetic components. The coils energize sequentially, causing the shutter to move.

It is yet another aspect of the disclosed embodiments to provide for a shutter that includes a linear array of ridges that are aligned with as friction wheel on the end of a rotatable pinion shaft. The friction wheel is in contact with the ridges, causing the shutter to move when the pinion shaft is rotated.

The aforementioned aspects and other objectives and advantages can now be achieved as described herein. A shutter plate-embedded linear motor drive is disclosed. The components of the linear motor are integrated into a sliding shutter plate. A linear array of permanent magnets may be attached to the shutter plate and may serve as a rotor equivalent; while a linear array of stationary coils may serve as a stator. The coils may be energized sequentially to achieve the desired movement of the shutter for example displacement, velocity, acceleration profile. There is generally a design trade-off between shutter size and placement accuracy.

The drive can also be a pinion shaft with a friction wheel at one end that can connect to the ridges or gear teeth and move the shutter when the shaft is rotated. An open coil permanent magnet motor is used, similar to that used in a computer hard-disk drive. These rotary drives present very low profile and position the disk drive magnetic head accurately.

For wide field of view applications, the present invention allows the shutter be as close to the window as possible to eliminate any stray IR energy entry into the chamber. Also, the shutter and movement mechanism do not intrude on the space in front of the lens assembly and hence minimize the size and cost of the lens assembly.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non limiting examples can be varied and are cited merely to illustrate at least one embodiment and are not intended to limit the scope thereof.

Figure 1:
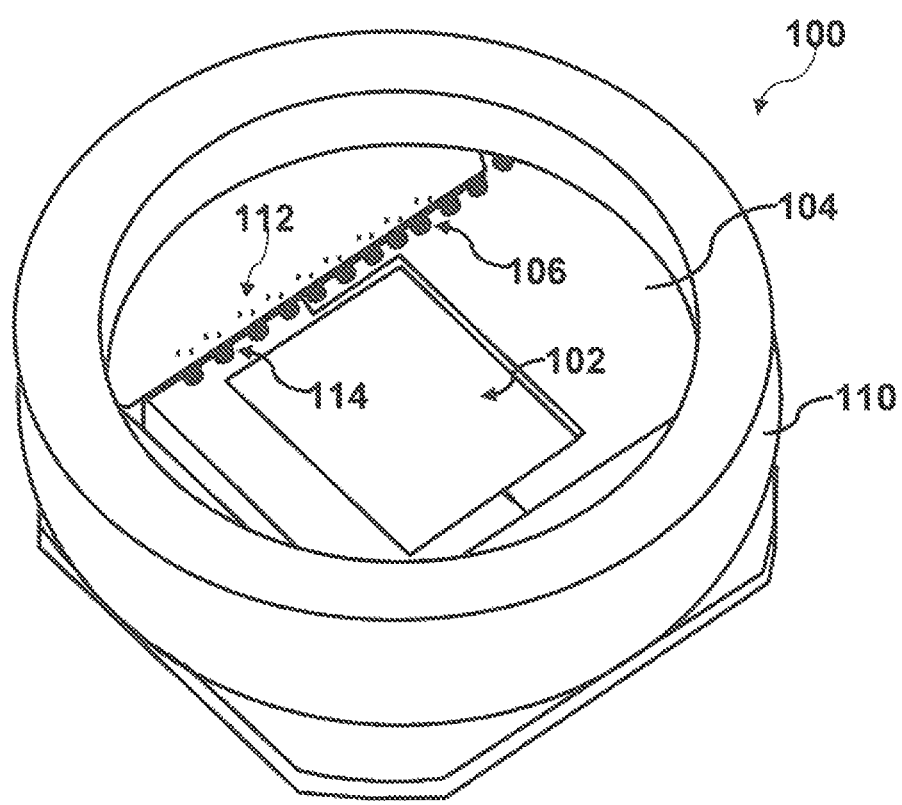
FIG. 1 illustrates a perspective view of a motor drive of a camera showing an Focal Plane Array (FPA) window with a shutter in open position, in accordance with the disclosed embodiments.

Referring to FIG. 1, a perspective view of a Focal Plane Array (FPA) 100 of a camera having a motor drive 112 with a shutter 104 in open position is shown. The FPA 100 has the motor drive 112, a linear array of permanent magnets 106, a linear array of stationary coils 114, FPA window 102, an outer FPA housing 110 and the shutter 104. The linear array of permanent magnets 106 are attached to the shutter 104 and to a power source (not shown) within the motor drive 112. When the power source is switched off, the linear array of stationary coils 114 are not energized and hence the shutter 104 remains closed as shown in FIG. 1. Note that the linear array of permanent magnets 106 and the linear array of stationary coils 114 constitute the motor drive 112.

Figure 2:
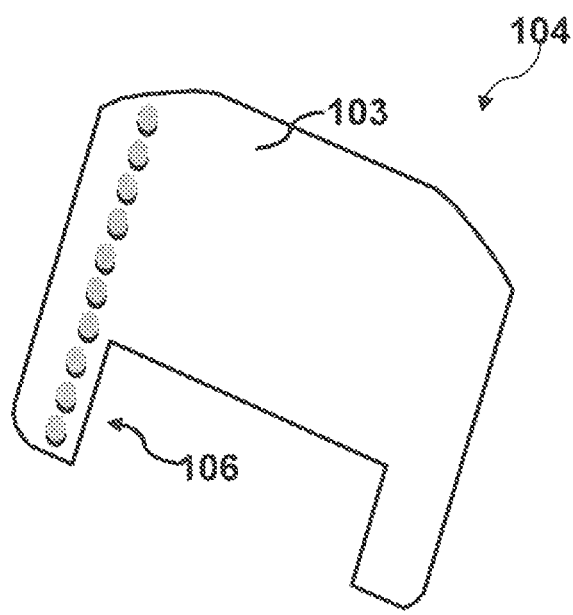
FIG. 2 illustrates a perspective view of a shutter depicted in FIG. 1, with magnets, in accordance with the disclosed embodiments.

FIG. 2 illustrates a perspective view of the shutter 104 depicted in FIG. 1, with the linear array of permanent magnets 106. The linear array of permanent magnets 106 are shown along one side of the shutter plate 103. When the shutter 104 is in closed position, it does not protrude the outer sides of the housing 110.

Figure 3:
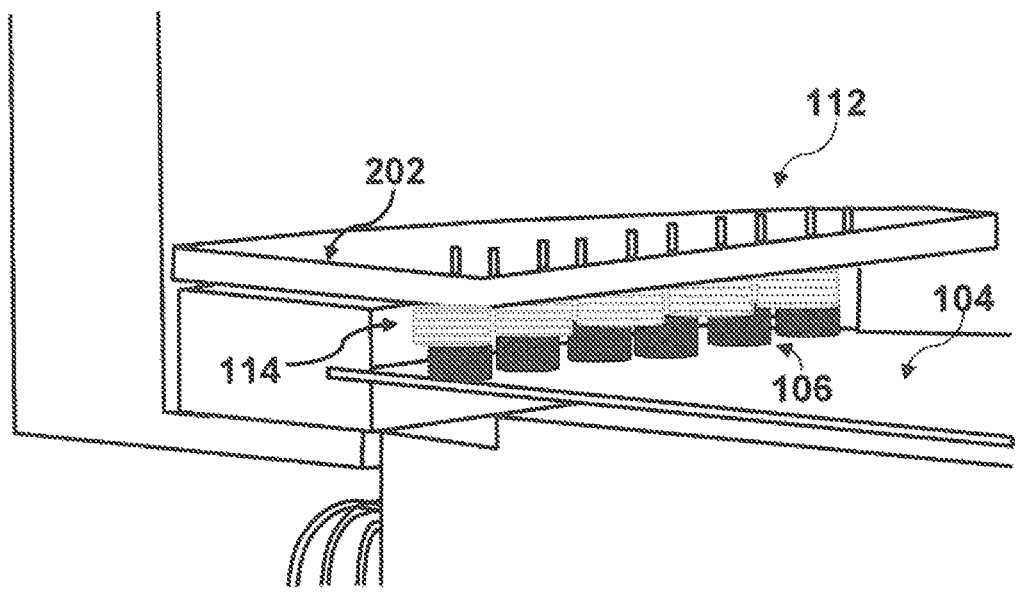
FIG. 3 illustrates a cross sectional view of the motor drive depicted in FIG. 1 showing a linear motor drive, drive coils and permanent magnets on the shutter, in accordance with the disclosed embodiments.
Figure 4:
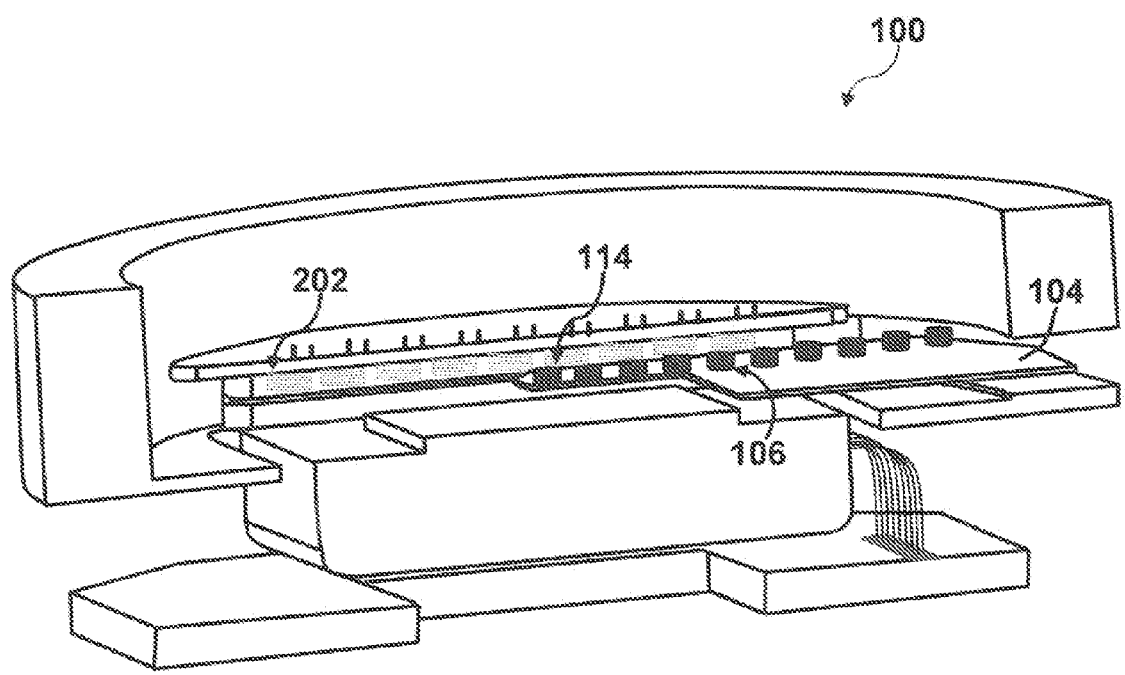
FIG. 4 illustrates a cross sectional view of the motor drive depicted in FIG. 1 with the shutter in open position, in accordance with the disclosed embodiments.

Referring to FIG. 3, a zoomed in cross section view of the motor drive 112 depicted in FIG. 1 is shown. The linear motor drive CCA 202 along with the linear array of stationary coils 114 and the linear array of permanent magnets 106 that are incorporated on the shutter 104 is shown. Referring to FIG. 4, a cross sectional view of the motor drive 112 depicted in FIG. 1 with the shutter 104 in the open position is shown. When the power source is switched on, the linear array of stationary coils 114 are energized sequentially to achieve desired movement of the shutter 104. The movement can be a displacement, a velocity and acceleration profile.

Figure 5:
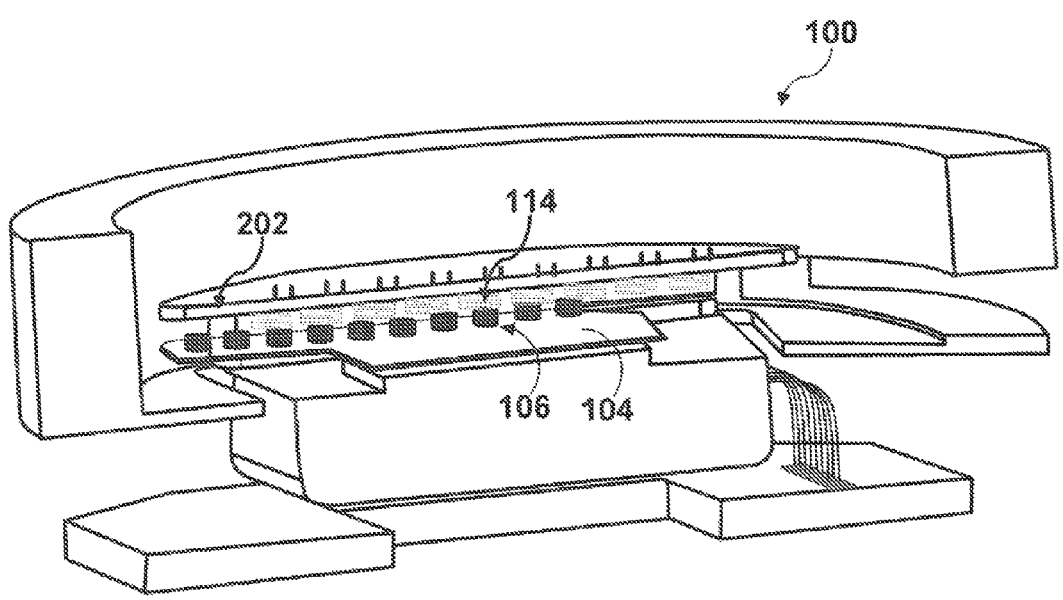
FIGS. 5-6 illustrate cross sectional views of the motor drive depicted in FIG. 1 with the shutter in closed position, in accordance with the disclosed embodiments.
Figure 6:
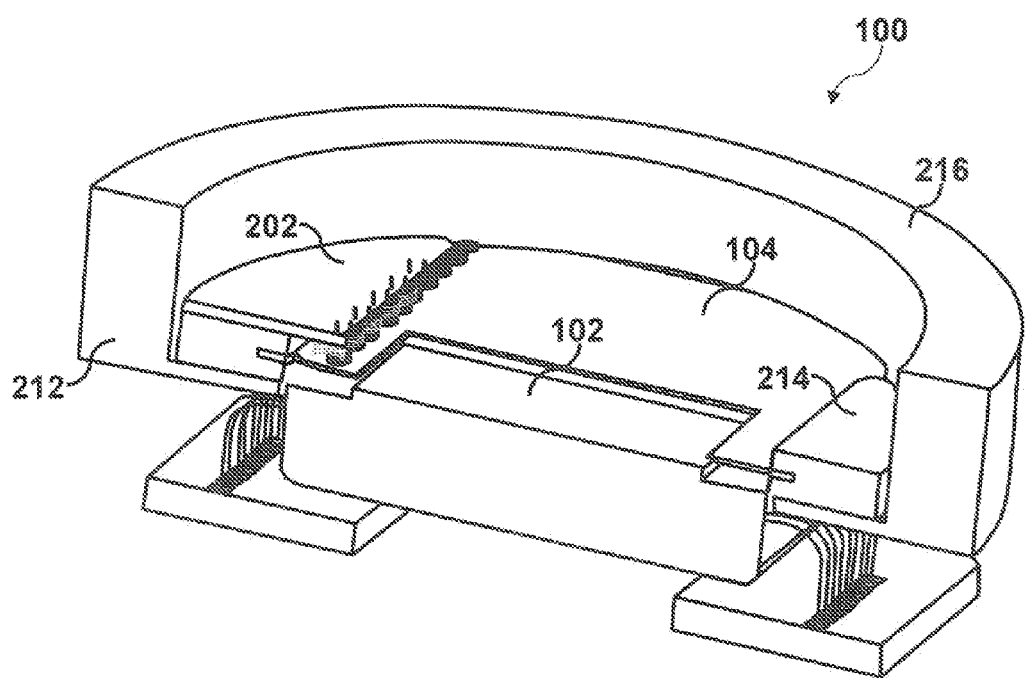
Figure 7:
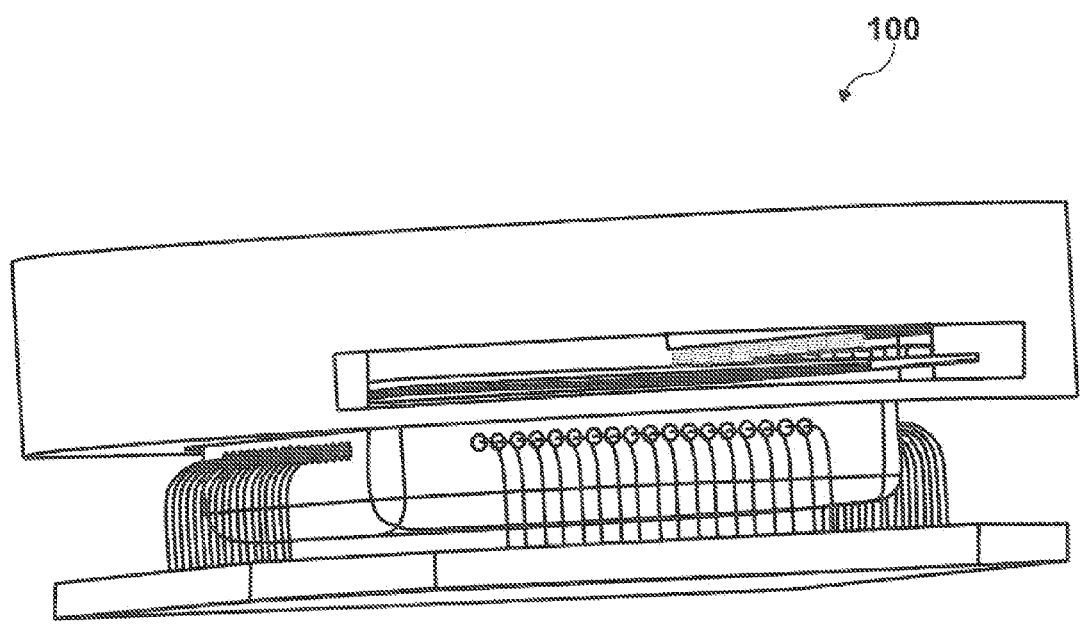
FIG. 7 illustrates a cross sectional view of the motor drive depicted in FIG. 1 with the shutter in open position, in accordance with the disclosed embodiments.

FIGS. 5-6 illustrate cross sectional views of the FPA 100 depicted in FIG. 1 with the shutter 104 in closed position, in accordance with the disclosed embodiments. Shutter guide 214 and mounting structure 216 are shown in FIG. 6. FIG. 7 illustrates a cross sectional view of the FPA 100 depicted in FIG. 1 with the shutter 104 in open position. Note that the components of the linear motor are integrated into the sliding shutter plate 103 depicted in FIG. 2. The linear array of permanent magnets 106 attached to the shutter plate 103 serve as a rotor equivalent and linear array of stationary coils 106 serve as a stator.

Figure 8:
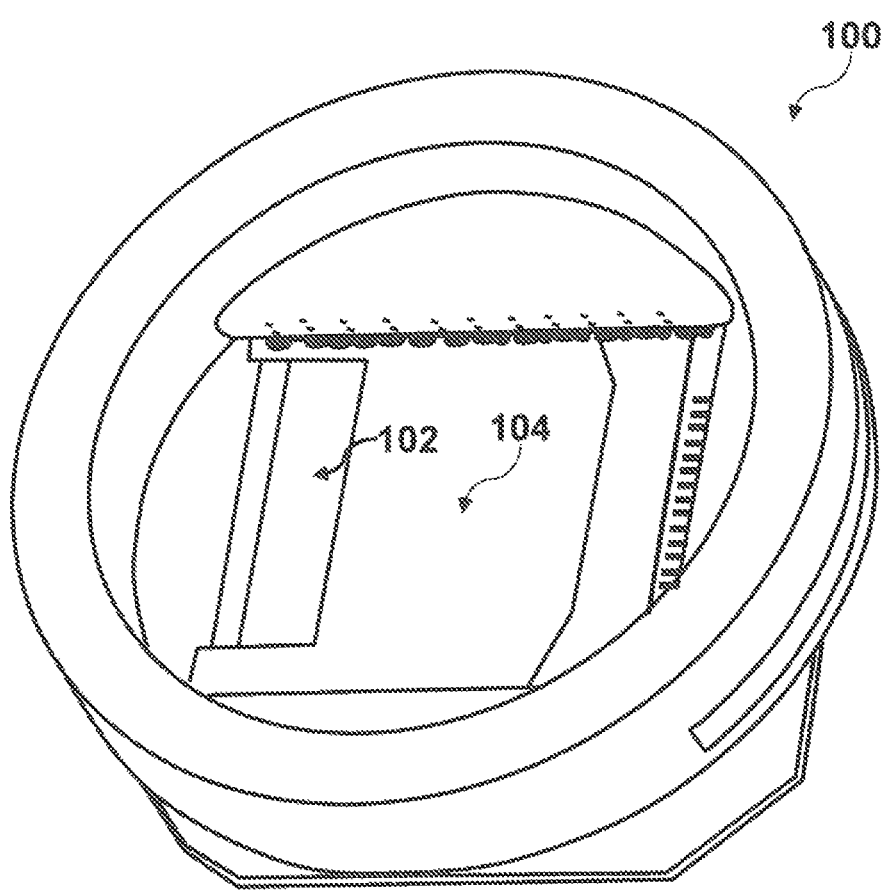
FIG. 8 illustrates a perspective view of a motor drive of a camera showing the FPA window with the shutter in closed position, in accordance with the disclosed embodiments.
Figure 9:
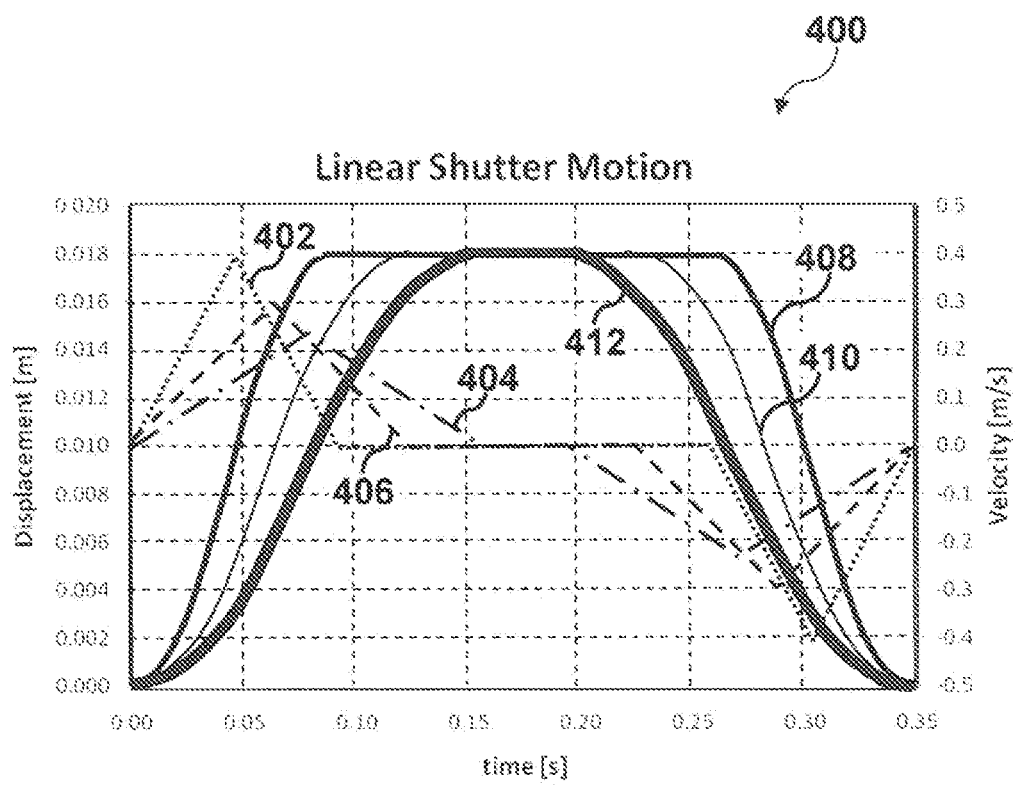
FIG. 9 illustrates a velocity, displacement, time graph for a linear shutter motion, in accordance with the disclosed embodiments.

FIG. 8 illustrates a perspective view of the FPA 100 depicted in FIG. 1 with the shutter 104 in closed position. When the power source is switched off, the linear array of stationary coils 114 are deenergized sequentially to close the shutter 104. Referring to FIG. 9, a velocity, displacement, time graph 400 for a linear shutter motion is depicted. The displacement versus time graph is shown in solid lines 408, 410 and 412 for the linear shutter motion. Dashed lines 402, 404 and 406 on the same graph illustrate the velocity versus time for the linear shutter motion.

Figure 10:
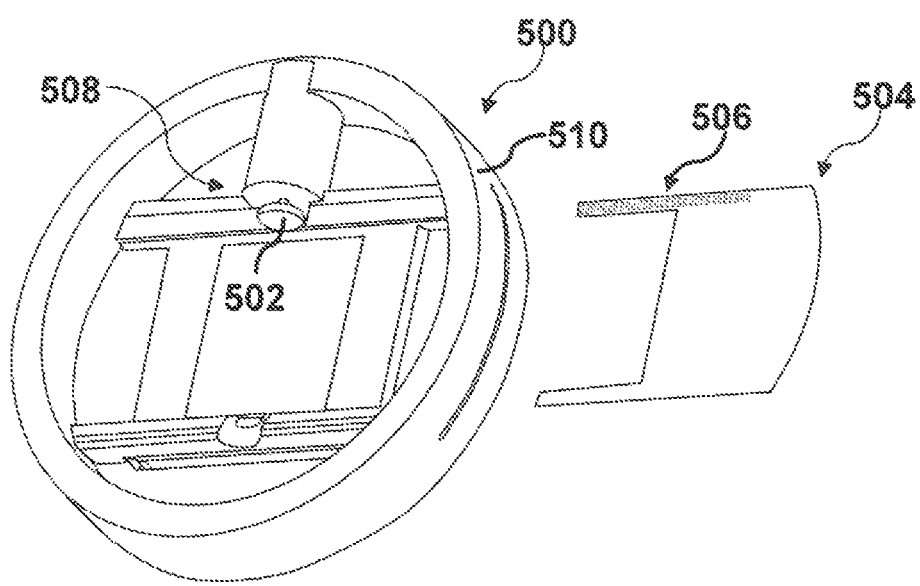
FIG. 10 illustrates a perspective view of a rack and pinion drive of a camera showing a shutter with rack features, in accordance with the disclosed embodiments.

Referring to FIG. 10, a perspective view of a EPA 500 with a rack and pinion drive 508 is shown. The rack and pinion drive 508 includes a pinion gear 502 also referred as friction wheel, that goes through the housing 510 and a set of rack features 508 on a shutter 504. A linear array of ridges is aligned with the friction wheel on the end of a rotatable pinion shaft. The friction wheel is in contact with the ridges, causing the shutter 504 to more when the pinion shaft is rotated. The friction wheel can be a gear or a high friction rubber material. Note that rack and pinion shutter drive can be utilized alternative to the magnetic drive. Note that the inner end of the pinion can be a gear wheel, a friction wheel, or any other surface with sufficient friction.

Figure 11:
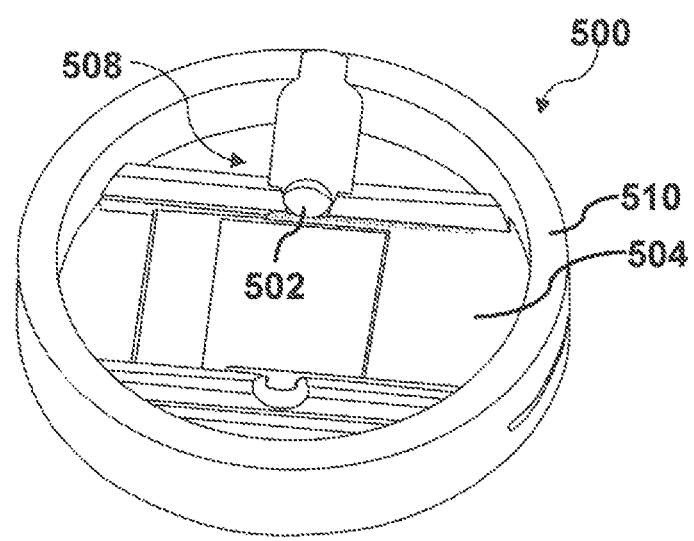
FIG. 11 illustrates a perspective view of the rack and pinion drive depicted in FIG. 10 with the shutter in open position, in accordance with the disclosed embodiments.
Figure 12:
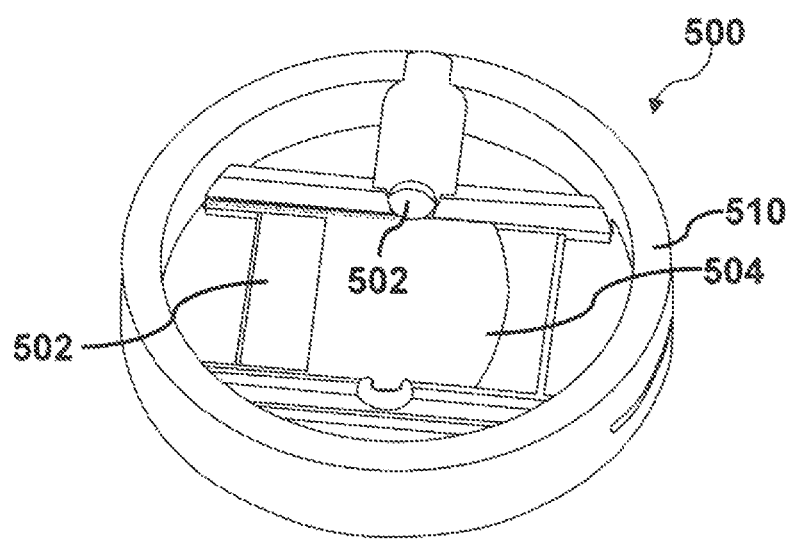
FIG. 12 illustrates a perspective view of the rack and pinion drive depicted in FIG. 10 with shutter in closed position, in accordance with the disclosed embodiments.

FIGS. 11-12 illustrate perspective views of the EPA 500 depicted in FIG. 10 with the shutter 504 in open and closed positions respectively. As shown in FIG. 11, the shutter 504 in the open position does not extend beyond the housing 510 of the FPA 500.

The present invention utilizes lower cost mechanism with smaller size actuator that enables the lens assembly to be placed closer to the FPA. Also closed shutter provides uniform IR source for EPA calibration and the lens assembly can be placed close to the EPA window to minimize the required lens diameter.

While the present invention has been described in connection with a preferred embodiment, it is to be understood that other similar embodiments may be used or modifications and additions may be made to the described embodiment for performing the same function of the present invention without deviating therefrom. Therefore, the present invention should not be limited to any single embodiment.

What is claimed is:

1. A motor drive for a camera comprising:
 a shutter comprising a shutter plate for covering a focal plane array window of said camera;
 a friction enhancement on said shutter plate;
 a drive mechanism comprising a positive drive comprising a rotatable pinion shaft and pinion gear on one end of said pinion shaft for achieving desired movement of said shutter; and a housing having outer sides for enclosing said shutter and said drive mechanism.

2. The motor drive of claim 1, wherein said shutter in an open position does not extend beyond said housing.

3. The motor drive of claim 1, wherein said shutter in a closed position does not protrude over an outer side of said housing.

4. The motor drive of claim 1, wherein said desired movement is displacement.

5. The motor drive of claim 1, wherein said shutter covers said focal plane array window in a closed position.

6. The motor drive of claim 1, wherein the friction enhancement on the shutter plate is an array of ridges attached to the shutter plate.

7. The motor drive of claim 6, wherein said array of ridges is attached to one side of said shutter plate.

8. The motor drive of claim 6, wherein desired movement of said shutter is achieved by direct engagement of said pinion gear with said array of ridges, inducing rotation of said pinion shaft.

* * * * *